US009259975B2

(12) United States Patent
Welter et al.

(10) Patent No.: US 9,259,975 B2
(45) Date of Patent: Feb. 16, 2016

(54) TIRE WITH OUTER GROOVE CONTAINING BONDED TUBE

(71) Applicant: The Goodyear Tire & Rubber Company, Akron, OH (US)

(72) Inventors: Carolin Anna Welter, Schleich (DE); Dinesh Chandra, Stow, OH (US); Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 143 days.

(21) Appl. No.: 14/168,235

(22) Filed: Jan. 30, 2014

(65) Prior Publication Data

US 2014/0261943 A1 Sep. 18, 2014

Related U.S. Application Data

(60) Provisional application No. 61/790,227, filed on Mar. 15, 2013.

(51) Int. Cl.
*B60C 23/12* (2006.01)
*B60C 19/00* (2006.01)
*B29D 30/72* (2006.01)

(52) U.S. Cl.
CPC ............... *B60C 19/00* (2013.01); *B29D 30/72* (2013.01); *B60C 23/12* (2013.01); *Y10T 152/10495* (2015.01)

(58) Field of Classification Search
CPC ........ B60C 19/00; B60C 19/04; B60C 23/10; B60C 23/12; B29D 30/72

USPC ............... 152/450, 523, 415, 418, 419, 426
See application file for complete search history.

(56) References Cited

U.S. PATENT DOCUMENTS

| 3,304,981 | A  | * | 2/1967 | Sheppard | B60C 5/00 |
| | | | | | 152/426 |
| 8,042,586 | B2 | * | 10/2011 | Losey | B60C 23/12 |
| | | | | | 152/415 |
| 8,113,254 | B2 | | 2/2012 | Benedict | 152/426 |
| 8,381,784 | B2 | * | 2/2013 | Delgado | B60C 23/12 |
| | | | | | 152/415 |
| 8,381,785 | B2 | * | 2/2013 | Losey | B60C 23/12 |
| | | | | | 152/415 |
| 8,596,318 | B2 | * | 12/2013 | Horiuchi | B60C 11/0309 |
| | | | | | 152/209.18 |
| 9,045,005 | B2 | * | 6/2015 | Gobinath | B60C 19/00 |
| 2013/0061996 | A1 | * | 3/2013 | Delgado | B60C 23/12 |
| | | | | | 152/523 |

FOREIGN PATENT DOCUMENTS

| EP | 2543524 | 1/2013 | ............. B60C 23/12 |
| EP | 2567834 | 3/2013 | ............. B60C 23/12 |
| WO | 2007/134556 | 11/2007 | ............. B60C 23/00 |

OTHER PUBLICATIONS

European Search Report received by Applicants Jun. 10, 2014.

* cited by examiner

*Primary Examiner* — John Walters
(74) *Attorney, Agent, or Firm* — Henry C. Young, Jr.

(57) ABSTRACT

The invention relates generally to a pneumatic rubber tire which contains an outer, annular, circular groove which contains a flexible tube bonded to the walls of the groove.

12 Claims, 6 Drawing Sheets

TIRE WITH OUTER GROOVE CONTAINING BONDED TUBE

This application claims the benefit of U.S. Provisional Application No. 61/790,227, filed Mar. 15, 2013.

This invention was made with government support under contract number DE-EE0005447 awarded by the Department of Energy. The government has certain rights in the invention.

FIELD OF THE INVENTION

The invention relates generally to a pneumatic rubber tire which contains an annular groove in its sidewall which contains an annular flexible tube within and bonded to the walls of the groove.

BACKGROUND OF THE INVENTION

Normal air diffusion through walls of a pneumatic rubber tire reduces tire pressure within the internal cavity of the tire over time. For this invention, an annular circular groove is provided in the sidewall of the tire in which contains a flexible (e.g. rubber) tube which is secured within the groove with a rubber coating and for which the tube acts to pump atmospheric air into the internal cavity of the pneumatic tire to aid in providing (e.g. maintaining) air pressure in the internal cavity of the pneumatic tire by alternating (e.g. sequential segmental) pressure impressed upon the tube by flexing of the tire, particularly the tire sidewall, during operation of the tire in service such as during vehicular operation of the tire.

SUMMARY AND PRACTICE OF THE INVENTION

In accordance with this invention, a pneumatic rubber tire is provided which contains a pneumatic cavity and is comprised of an outer circumferential tread, spaced apart bead portions, two sidewalls individually connecting said bead portions with the periphery said tread and carcass supporting said tread and sidewalls, wherein at least one of said sidewalls (the term sidewall is to include the tire sidewall extended to a bead portion of the tire to that the term sidewall is intended to include a chafer component of the tire which can extend outward from the bead portion) contains at least one annular groove in its outer surface, wherein said groove contains an annular elastomeric tube within said groove, wherein tube is secured within said groove with a rubber coating contained in said groove which communicates with (contacts) both the wall of said groove and the said tube.

In practice, said groove is desirably exclusive of (does not contain) an adhesive other than said rubber coating (e.g. exclusive of an RFL adhesive such, for example, a rescorcinol/formaldehyde latex based adhesive and, for example, cyano acrylate based adhesive and, for example, a tetrahydrofuran based adhesive) to secure said tube within said groove.

In practice, an optional rubber cover strip is provided to aid in securing the tube within the groove where the cover strip abridges the opening of the groove in the tire sidewall which contains the rubber coated tube.

In practice, the tire sidewall groove deforms by bending in a manner of partially collapsing and partially expanding to thereby alternatively compress and decompress the tube contained within groove to cause an autogeneous pumping action to occur in a sense of pumping atmospheric air into the pneumatic cavity of the tire.

In practice, the tire sidewall groove therefore deforms in a peristaltic manner to create the air pumping action.

The term peristaltic refers to operating by means of wavelike contractions that propel contained matter, such as air, along tubular pathways. The term autogenous, or autogenously, refers to an event which inherently occurs by an operational activity.

In one embodiment, the tube desirably contains a valve to enable flow of atmospheric air into the tube when it is needed to maintain proper inflation of the tire and a valve to control the flow of the air from the tube into the tire cavity by as it is pumped by the undulation of the tube contained in the groove caused by the flexing of the tire sidewall during the tire rotation.

In further accordance with this invention, a process of securing an elastomeric tube within an annular groove contained in an outer sidewall of a cured pneumatic tire comprises the steps of:

(A) cleaning the walls of said groove to remove a release coating contained on the groove walls (release agent coating such as, for example a silicone based composition previously applied to the tire surface to facilitate releasing the tire from the surface of its mold within which the tire is cured under conditions of elevated heat and pressure). It is to be appreciated that such cleaning of the groove sidewalls may be by, for example, at least one of abrading (e.g. by surface grinding) or by organic solvent cleaning), (B) applying an uncured sulfur curable liquid rubber coating to the groove surface (e.g. thin coating on the groove walls), (C) positioning said tube within the groove with said uncured liquid rubber coating in contact with and between said tube and groove surface (e.g. in a manner for the rubber coating to contact and thereby communicate with the surfaces of both the tube and groove wall, (D) applying an additional coating of the said uncured liquid rubber to an exposed surface of the tube contained within the groove, and (E) curing the uncured sulfur curable liquid rubber to thereby secure the tube within the groove;

wherein said sulfur curable liquid rubber is comprised of:
(1) a low viscosity, flowable diene-based elastomer composition (e.g. of a sufficiently low viscosity to conveniently flow into and coat the wall of the groove by convenient means), or
(2) organic solvent solution (e.g. a cement) comprised of an organic solvent and diene-based rubber composition (where said rubber composition may be comprised a high or low viscosity diene-based elastomer), wherein said rubber composition may be cured by sulfur curing.

The sulfur curing may be conducted at an elevated temperature or at lower temperature by including additives to promote the lower temperature sulfur curing.

In one embodiment, the groove is an annular groove in the sidewall of the tire.

In one embodiment the rubber composition of the rubber coating may contain calcium oxide (e.g. to promote drying of the rubber composition which may contain moisture such as, for example, atmospheric moisture).

In an embodiment of such process of this invention, a cover strip of a sulfur vulcanizable diene-elastomer containing rubber composition is applied over the groove which contains the liquid rubber coated tube in a manner to:

(A) abridge the opening to the groove and thereby contact the surface of the tire sidewall, (B) contact the liquid rubber coating on the tube, and optionally contact a wall of said groove, wherein the combination of cover strip and rubber coating contained on the tube and groove walls and tube and in contact with the cover strip are co-cured together to secure the tube within the groove.

BRIEF DESCRIPTION OF ACCOMPANYING DRAWINGS

IN THE DRAWINGS

Figure 1:
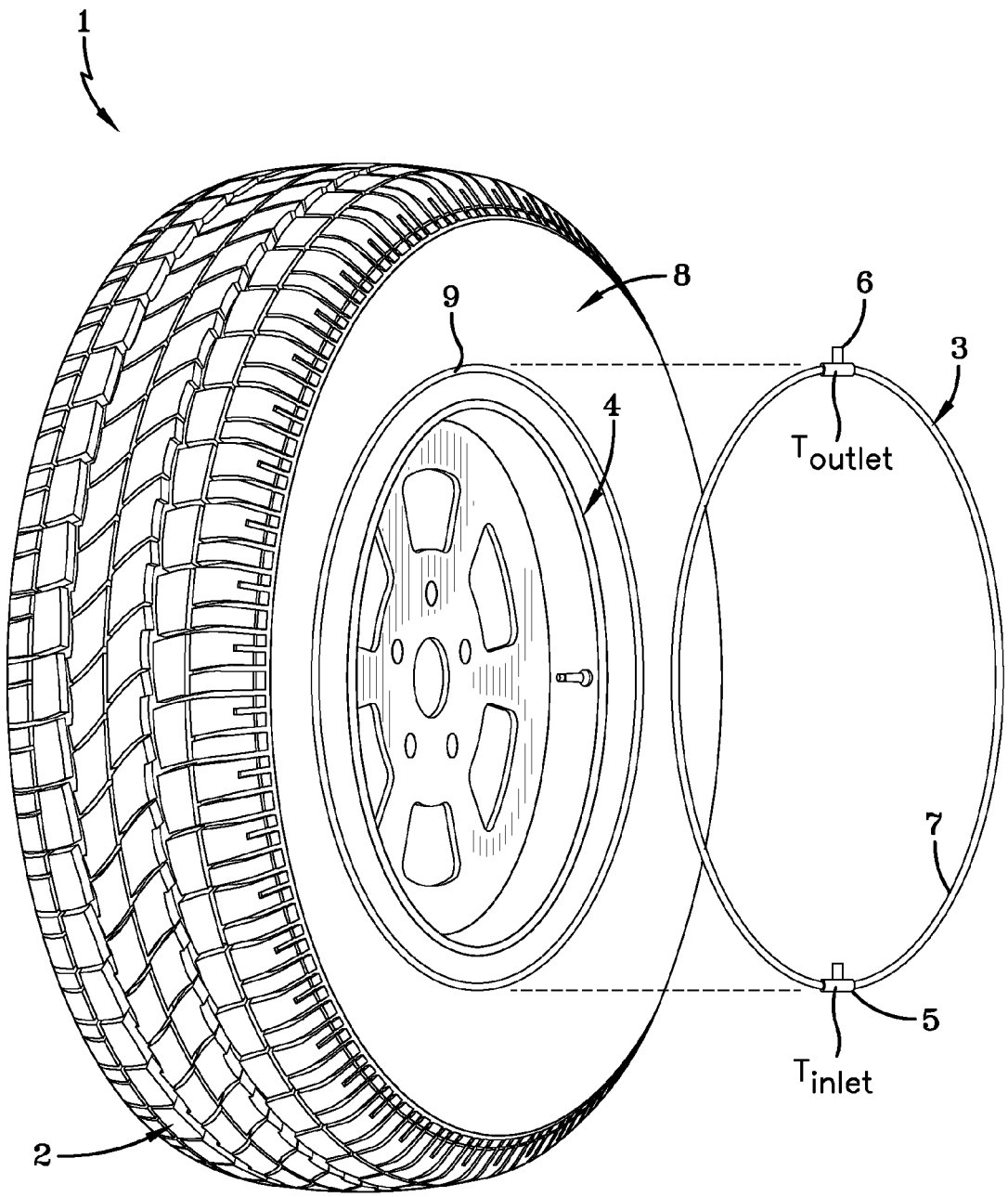
FIG. 1 depicts a perspective view of a pneumatic tire with an annular groove in its sidewall to which an annular flexible tube is to be inserted.

In FIG. 1 a prospective view of a cured pneumatic tire (1) mounted on a rigid rim (4) is provided with a circumferential tread (2) and sidewall (8) which contains an exposed and open annular (or circular) groove (9) in the outer surface of its sidewall (8) into which an annular (or circular) curable, cured elastomeric tube (3) with a wall (7) to define a cavity within the tube (not shown or numbered in this Figure) is to be inserted where the tube (3) contains a regulator such as, for example, a valve (5) to enable air to enter the tube when it is needed to maintain proper inflation of the tire, labeled as (T inlet) and a regulator such as a valve (6) to enable air to exit the tube, and eventually into the cavity of the pneumatic tire, labeled as (T outlet). The regulators (5) and (6) may be combined, positioned together or spaced apart.

Figure 2:
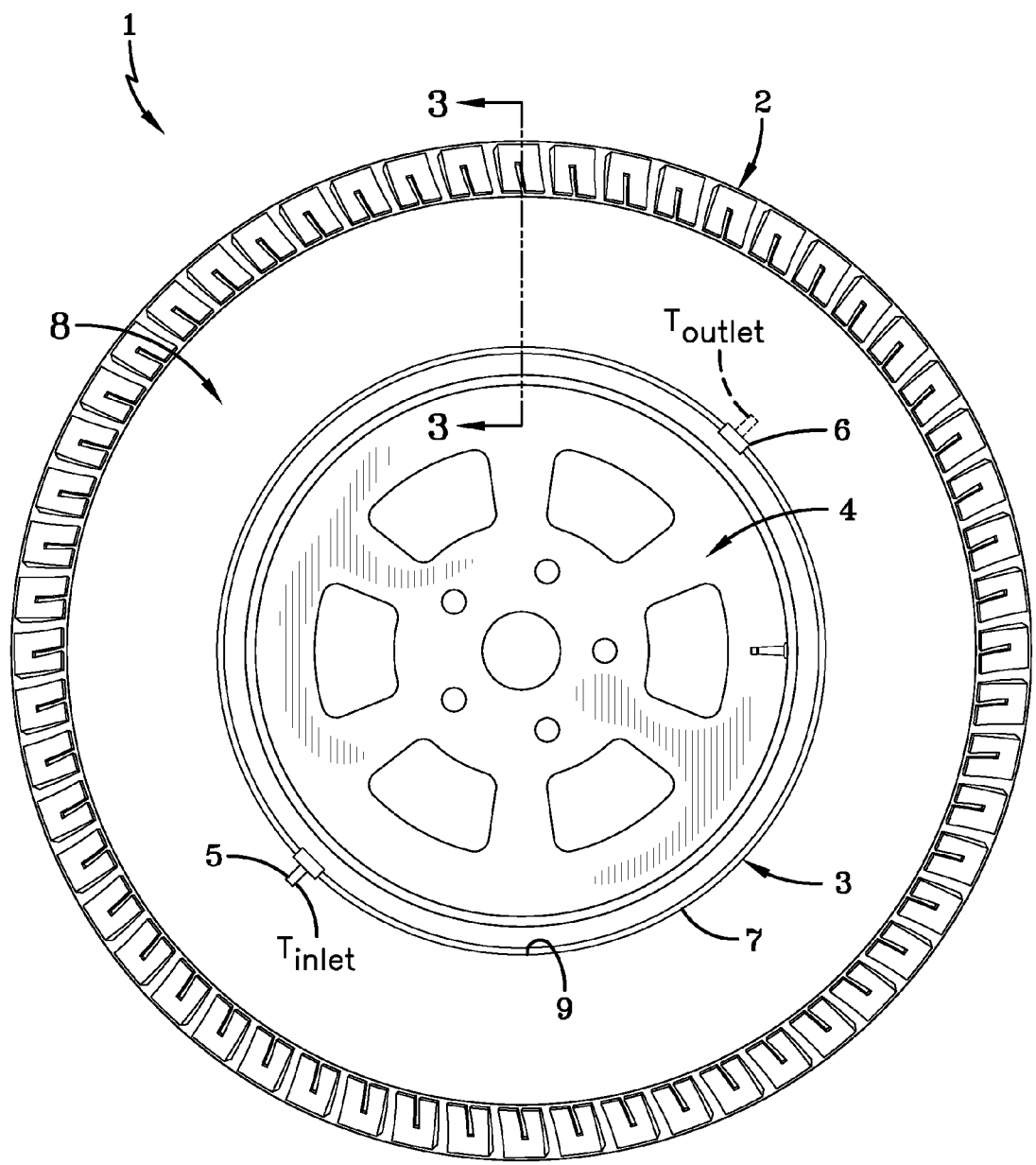
FIG. 2 depicts the tire of FIG. 1 with the flexible tube inserted in the annular groove in its sidewall.

In FIG. 2, a side elevation view of the cured pneumatic tire (1) is presented with the tube (3) contained in the open annular groove (9) contained in its outer and exposed tire sidewall (8).

Figure 3:
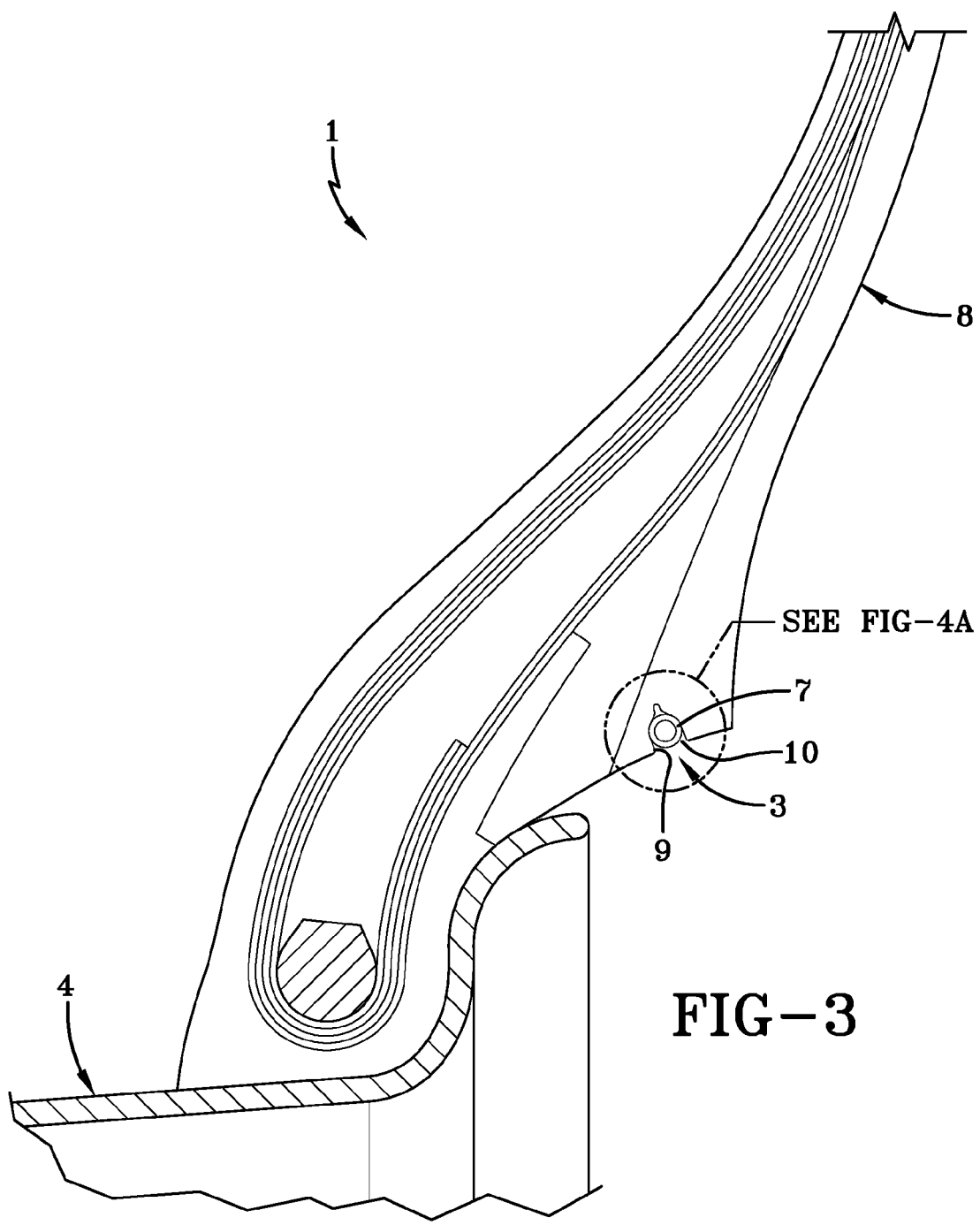
FIG. 3 is a partial cross sectional view of the tire of FIG. 1 depicting the flexible tube inserted into an annular groove.

In FIG. 3, an enlarged partial cross sectional view a lower portion of the tire (1) is presented which illustrates the open groove (9) containing the cured elastomeric tube (3), shown with its wall (7) where the tube (3) is inserted into the groove (9) through the groove opening (10).

Figure 4A:
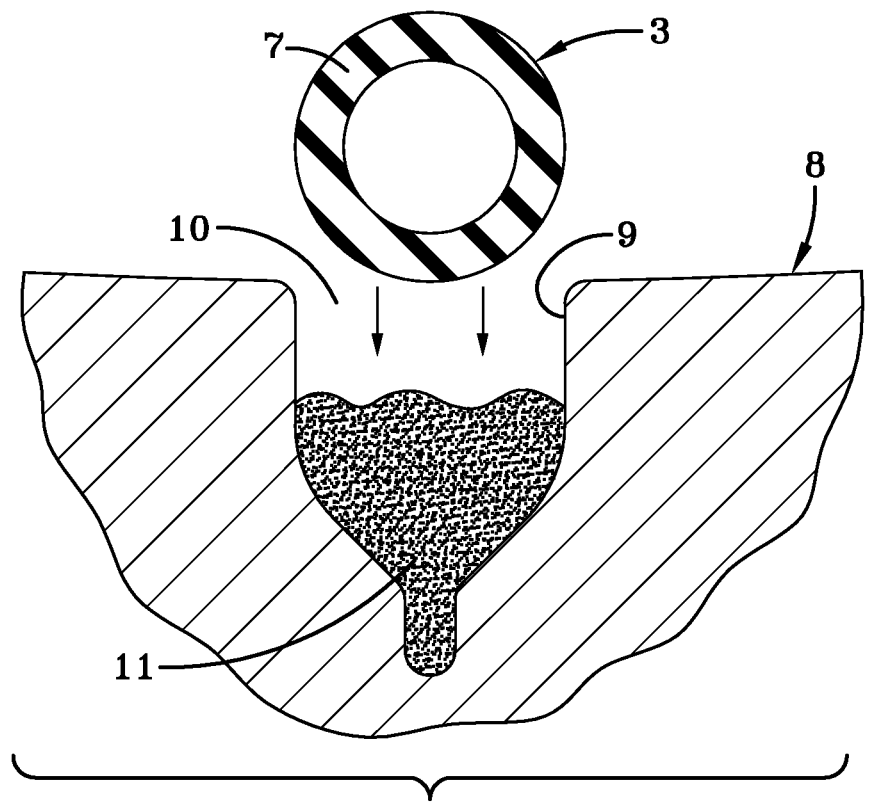
FIG. 4A is a partial cross sectional view of the tire of FIG. 1 with the flexible tube being positioned to be placed into the annular groove where the annular groove contains a liquid rubber within the groove.

In FIG. 4A, an enlarged view of FIG. 3 is presented showing the open groove 9 in the tire sidewall (8) which contains a reservoir of liquid uncured curable rubber (11) within the groove walls (9) of the open groove (3) with the uncured, curable hollow elastomeric tube (3) with the tube wall (7) defining its internal cavity (not numbered) being inserted into the open groove (3) through its groove opening (10).

Figure 4B:
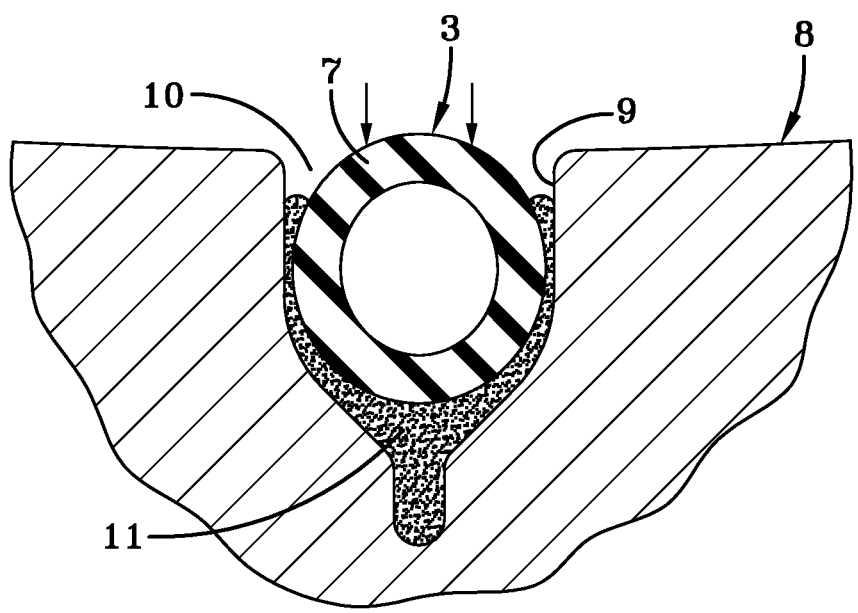
FIG. 4B is a partial cross sectional view of FIG. 4A with the flexible tube positioned in the annular groove in a manner to displace a portion of the liquid rubber and cause the displaced liquid rubber to flow between the outer surface of the flexible tube and walls of the groove to thereby secure the tube within the groove.

In FIG. 4B, FIG. 4A is further illustrated with the tube (7) having been inserted into the open groove (3) to displace a portion of the reservoir of liquid uncured, durable rubber to cause it to flow between the sides of the tube (7) and walls of the groove (3) and to thereby partially enclose (or partially encompass) tube (3) within the groove (9).

Figure 4C:
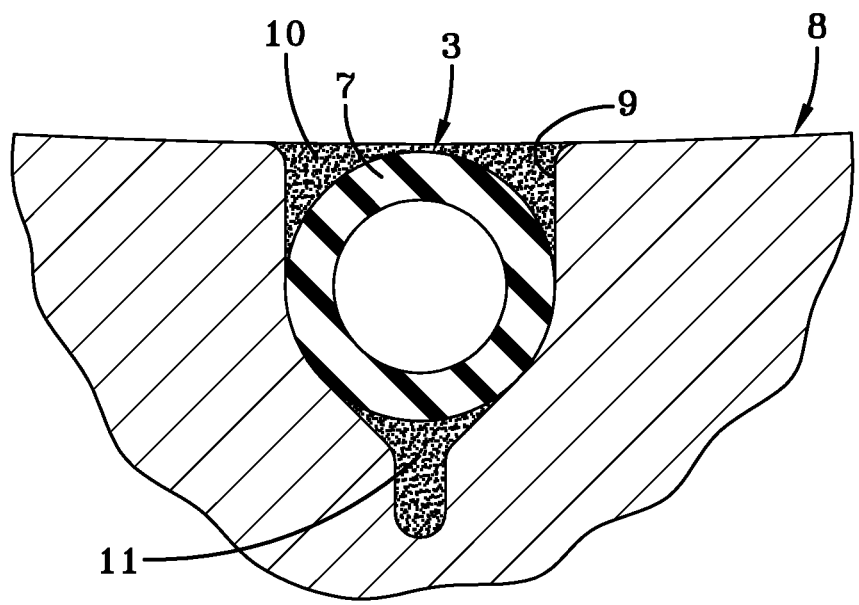
FIG. 4C depicts the tube secured within the groove by the liquid rubber.

In FIG. 4(C), FIG. 4B is further illustrated where additional liquid rubber has been added to the groove (3) to cause the tube to be encompassed by the liquid rubber within the groove (3). In one embodiment, the liquid rubber is cured to form an elastomeric rubber to secure the elastomeric tube (7) within the groove (9).

Figure 4D:
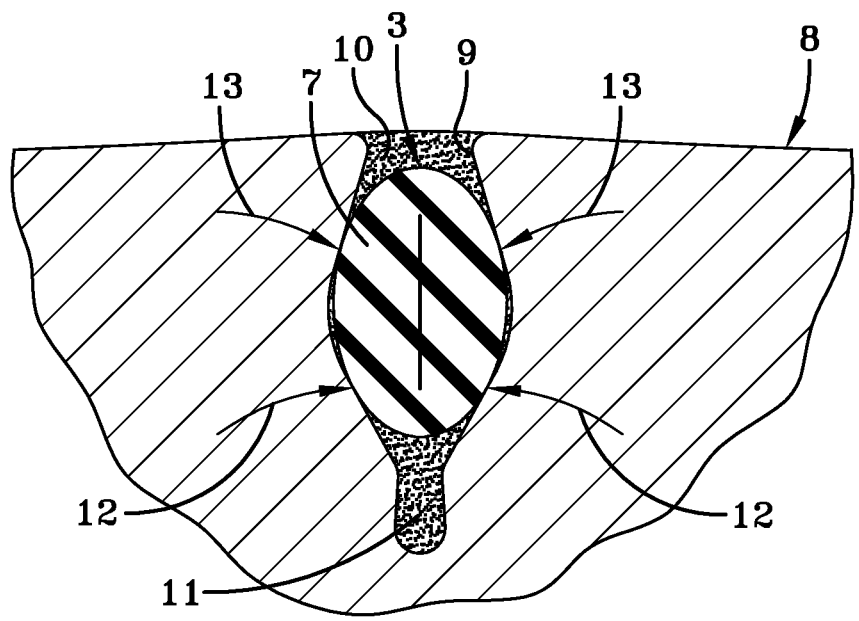
FIG. 4D depicts the tube being compressed during an operation of the tire.

In FIG. 4(D), FIG. 4C is further illustrated with the liquid rubber cured to form an elastomer to secure tube (3) within the groove (9) wherein the wall (7) of the tube (3) has been compressed to close the internal tube cavity (not numbered) by the flexing of the tire sidewall (8) to begin an air pumping action of the tube (3) to pump air from the outside of the tire (1) to the pneumatic tire's inner air cavity through the aforesaid regulator and valve caused by the flexing of the tire sidewall during the tire rotation.

Figure 5A:
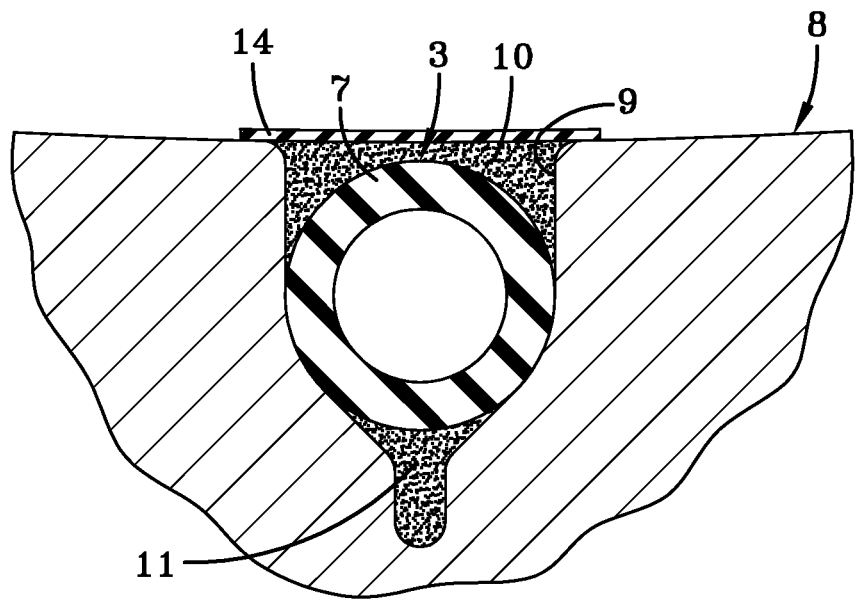
FIG. 5A depicts a rubber layer covering over the groove opening.

In FIG. 5(A), FIG. 4(C) is further illustrated with a rubber layer (14) applied over the opening (10) of the groove (3) to further secure the tube (3) within the groove (3) where the rubber layer (15) overlaps a portion of the tire sidewall (8).

Figure 5B:
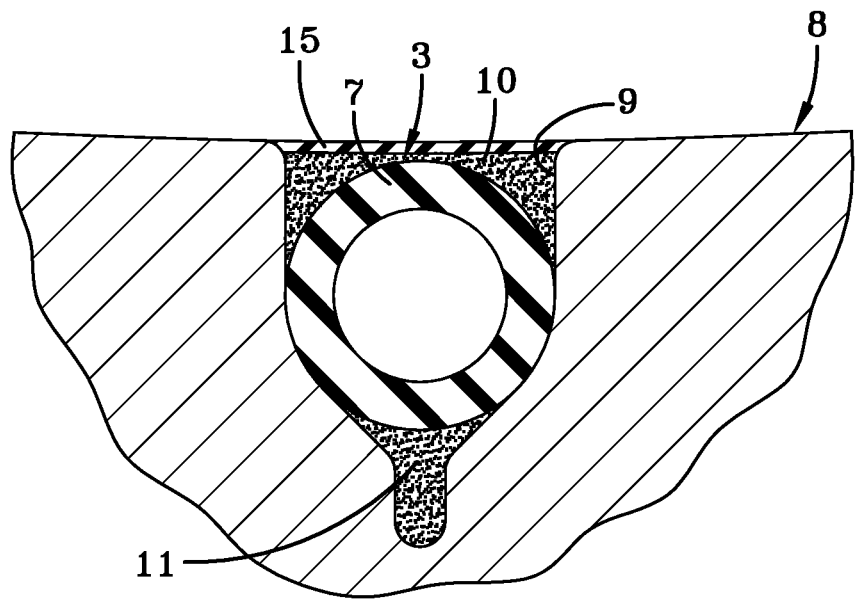
FIG. 5B depicts a rubber layer positioned within the groove to cover the groove opening.

In FIG. 5(B), FIG. 5(A) is further illustrated where the rubber layer (15) is fitted within the groove (3) to join the sides (9) of the groove (3) without overlapping the tire sidewall (8).

As a partial summary of various embodiments of the invention, a method of making a tire is provided comprised of the steps of:

(A) providing a tire having a groove in its sidewall,
(B) applying a coating of liquid rubber to the wall of the groove,
(C) insert a flexible tube within the groove,
(D) applying a coating of the liquid rubber onto the tube within the groove,
(E) heating the groove and tube to effect a curing of the applied rubber coatings.

In one embodiment such method is provided wherein said liquid rubber coating contains calcium oxide.

In one embodiment, such method is provided wherein a heated platen is used to cure the applied rubber coating in the groove.

In one embodiment, such method is provided wherein an uncured rubber cover strip is applied over the groove to contain the tube and liquid rubber coatings.

In one embodiment, such method is provided wherein the tire is a cured rubber tire which contains said groove in its sidewall.

In one embodiment, such method is provided wherein the tire is a uncured rubber tire which contains said groove in its sidewall.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed is:

1. A pneumatic rubber tire contains a pneumatic cavity and is comprised of an outer circumferential tread, spaced apart bead portions, two sidewalls individually connecting said bead portions with the periphery said tread and a carcass supporting said tread and sidewalls, wherein at least one of said sidewalls contains at least one annular groove in the outer surface of said sidewall, wherein said groove contains groove walls and an elastomeric tube within said groove, wherein tube is secured within said groove with a sulfur cured rubber contained in said groove which communicates with the walls of said groove.

2. The tire of claim 1 wherein said elastomeric tube is secured within said groove by said rubber coating without an adhesive.

3. The tire of claim 1 wherein a rubber cover strip is provided to secure said elastomeric tube within the groove where the said rubber cover strip abridges said groove in the tire sidewall and contacts the said sulfur cured rubber contained in said groove.

4. The tire of claim 3 wherein said rubber cover strip and rubber coating within the groove are co-cured together.

5. The tire of claim 1 wherein the said tire sidewall groove deforms by bending in a manner of partially collapsing and partially expanding to thereby alternatively compress and decompress the elastomeric tube contained within groove to cause an autogeneous pumping action to occur in a sense of pumping atmospheric air into the pneumatic cavity of the tire.

6. The tire of claim 5 wherein said elastomeric tube contains a regulator to control flow of atmospheric air into the elastomeric tube and a regulator to control the direction of the air flow from the tube into the tire cavity said air is being pumped by the undulation of the tube contained in the groove caused by the flexing of the tire sidewall during the tire rotation.

7. A process of securing an elastomeric tube within a circular, annular groove contained in an outer surface of a sidewall of a cured rubber pneumatic tire which comprises the steps of:
 (A) cleaning the walls of said groove to remove a release coating contained on the groove walls,
 (B) applying a sulfur curable liquid rubber coating on the groove surface within the groove,
 (C) positioning said elastomeric tube within the groove with said rubber coating between, and thereby in contact with, both of said tube and groove walls,
 (D) applying an additional amount of the liquid rubber coating an exposed surface of the tube contained within the groove, and
 (E) curing the rubber coating to thereby secure the tube within the groove;
 wherein said sulfur curable rubber is comprised of:
  (1) a low viscosity, flowable, diene-based elastomer composition, or
  (2) organic solvent solution comprised of an organic solvent and diene-based rubber composition,
 wherein said rubber composition is cured by sulfur curing.

8. The process of claim 7 wherein said rubber composition contains calcium oxide.

9. The process of claim 7 wherein a cover strip of a sulfur vulcanizable rubber composition is applied over said groove which contains the rubber coated tube in a manner to:
 (A) abridge the opening to the groove and thereby contact the surface of the tire sidewall, and
 (B) contact the rubber coating on the tube,
 wherein the combination of said cover strip and rubber coating contained on the tube and groove walls and tube and which is in contact with the cover strip are co-cured together to secure the tube within the groove.

10. The process of claim 9 herein said cover strip also contacts a wall of said groove.

11. The process of claim 9 where the groove surface does not contain an adhesive.

12. The method of claim 7 wherein a heated platen is used to heat and cure the said rubber coating contained in said groove.

\* \* \* \* \*